Feb. 22, 1927. 1,618,329
B. H. FUQUAY
PLANTER
Filed Sept. 15, 1923 3 Sheets-Sheet 1
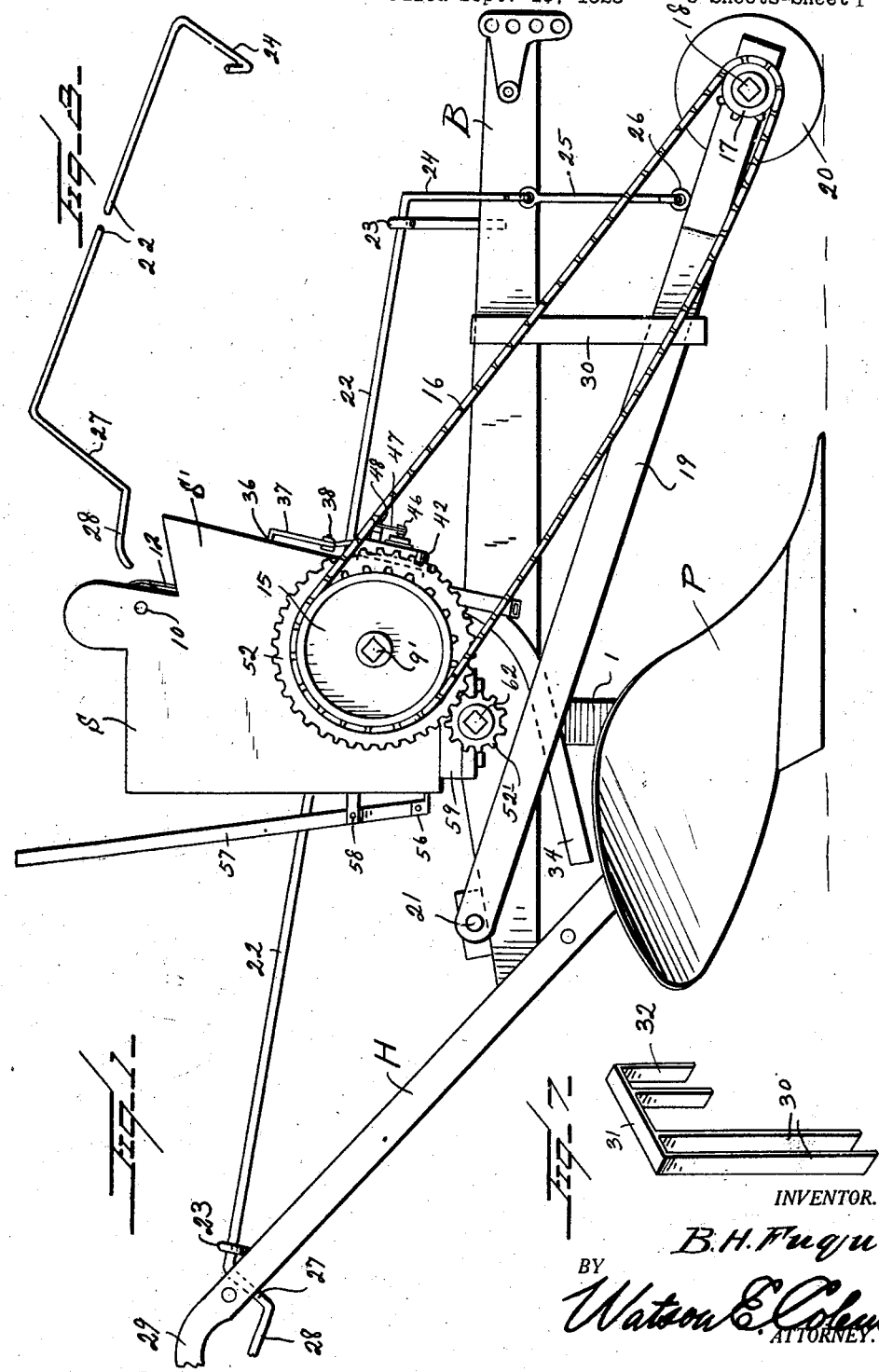
INVENTOR.
B. H. Fuquay
BY
Watson E. Coleman
ATTORNEY.

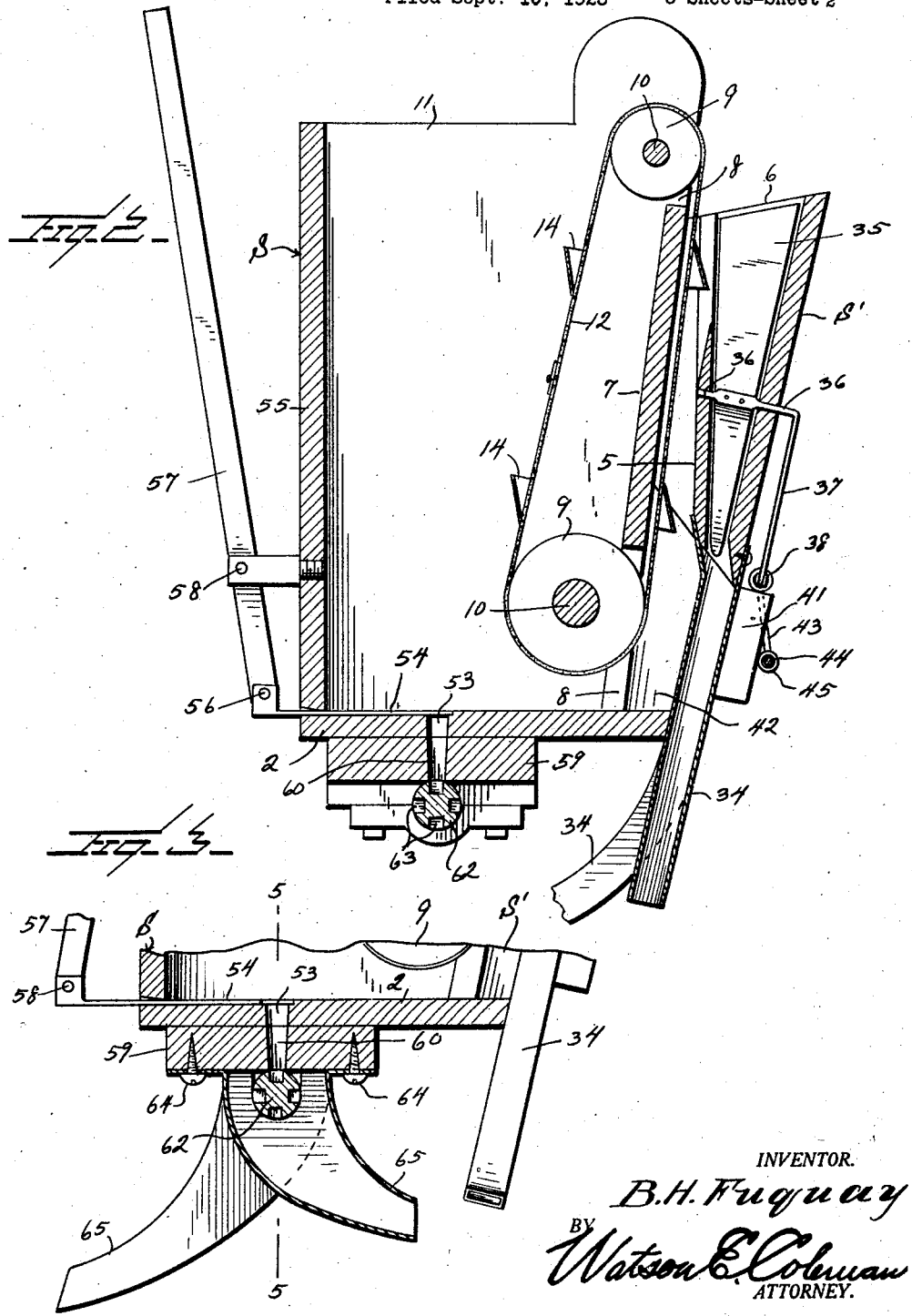

Feb. 22, 1927.
B. H. FUQUAY
1,618,329
PLANTER
Filed Sept. 15, 1923    3 Sheets-Sheet 3
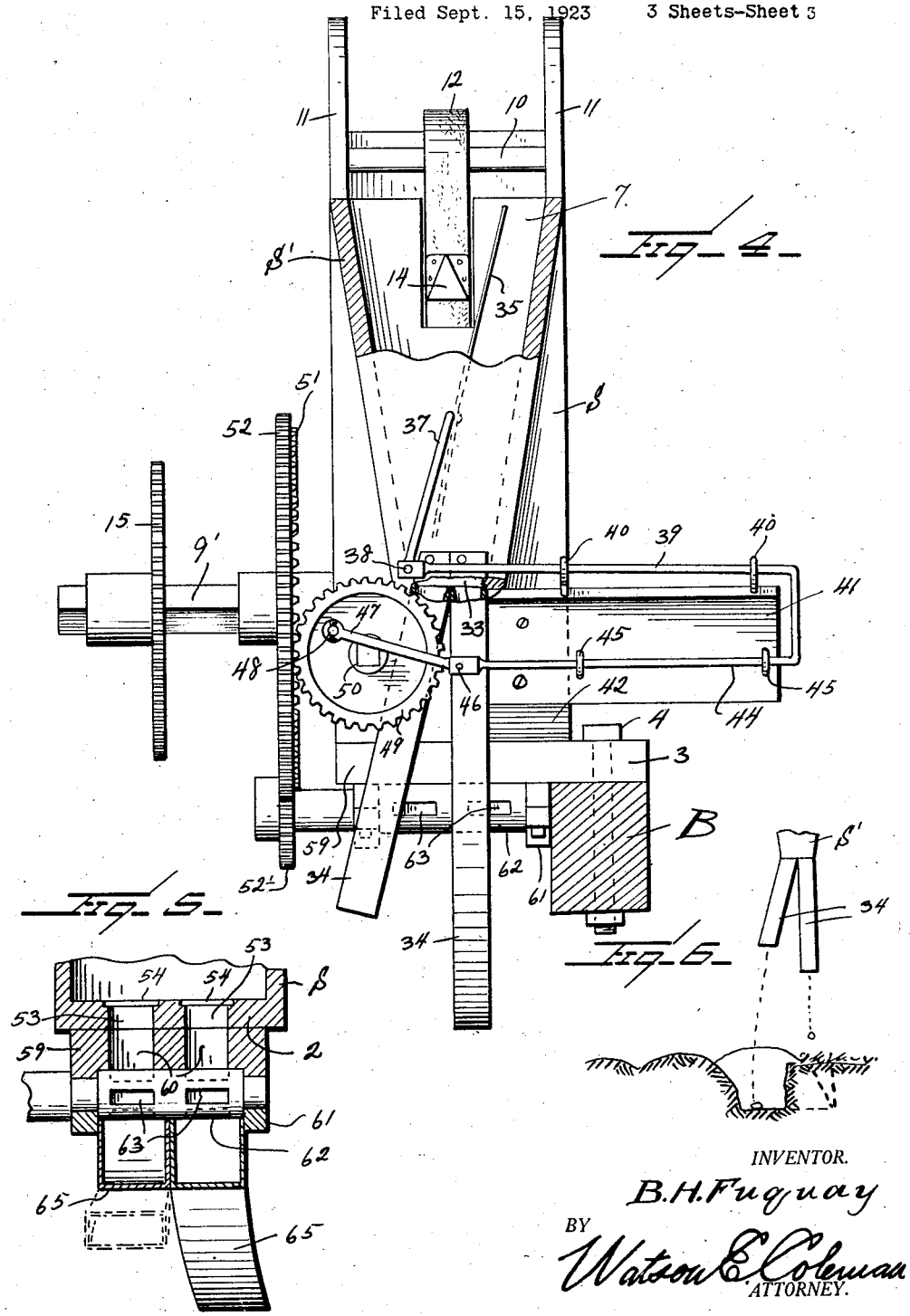

Patented Feb. 22, 1927.

1,618,329

UNITED STATES PATENT OFFICE.

BENJAMIN H. FUQUAY, OF DURHAM, NORTH CAROLINA.

PLANTER.

Application filed September 15, 1923. Serial No. 662,871.

This invention relates to certain improvements in planters and it is an object of the invention to provide a novel and improved device of this general character which can be readily employed for either dropping or sowing the seed.

It is also an object of the invention to provide a novel and improved device of this general character adapted to deposit the seed within adjacent furrows in a field where two plows are being used, one of which is equipped with my device and in a manner whereby the seed is dropped in a furrow being dug and in a second previously prepared furrow being covered, whereby the planting operation in a field is materially facilitated.

Another object of the invention is to provide a novel and improved device of this general character which may be readily and conveniently mounted on the beam of a plow together with ground engaging means operating upon travel of the plow to effect the desired operation of the planting mechanism proper.

The invention consists in the details of construction and in the combination and arrangement of the several parts of my improved planter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation of a planter constructed in accordance with an embodiment of my invention and in applied position;

Figure 2 is an enlarged fragmentary view partly in section and partly in elevation illustrating in detail certain features of the invention as herein disclosed and with the mechanism arranged for dropping;

Figure 3 is a fragmentary sectional view illustrating the mechanism in adjustment for use in sowing;

Figure 4 is a view in front elevation of the mechanism illustrated in Figure 2 with portions broken away;

Figure 5 is a detailed sectional view taken substantially on the line 5—5 of Figure 1, with certain of the parts indicated by broken lines;

Figure 6 is a diagrammatic view illustrating the manner of operation of my improved planter as herein set forth;

Figure 7 is a view in perspective of the guiding member herein employed for use in connection with the ground engaging means for operating the planting mechanism;

Figure 8 is a view in perspective of the lever herein employed for moving out of working position the ground engaging means for operating the planting mechanism.

As disclosed in the accompanying drawings, B denotes the plow beam of a conventional type or other suitable supporting member and which has associated therewith in the well known manner the plow P and also associated with the beam B in the ordinary way is the handle structure H of the type generally employed in connection with plows of the walking style.

Supported upon the beam B and preferably at a point above the plow standard 1 is a seed supply hopper S of desired dimensions. Underlying the bottom 2 of the hopper S is a plate 59 having an extended portion 3 for direct contact from above with the beam B, said extended portion 3 being secured to the beam B by bolts or the like as indicated at 4 in Figure 4. The forward end of the hopper S is provided with a supplemental hopper S' having its upper end open and in which is arranged a partition 5 providing a seed receiving chamber 6. The wall 7 of the hopper S immediately adjacent to the supplemental hopper S' in its upper and lower portions is provided with the openings or recesses 8 arranged at substantially the transverse center of the hoppers S and S' and through which extend the discs or rollers 9. Each of the discs or rollers 9 is carried by a shaft 10 rotatably supported by the side walls 11 of the hopper S.

Disposed around the discs or rollers 9 is an endless member or belt 12 provided at spaced points therealong with the buckets 14 whereby upon proper travel of the member or belt 12 the seeds within the hopper S will be elevated and discharged within the seed compartment 6. The lower shaft 10 has one end portion extending exteriorly of the hopper S and to said extended portion 9' is suitably affixed a sprocket wheel 15 with which is engaged an endless chain 16. The chain 16 is also engaged with a sprocket 17 carried by a shaft 18 rotatably supported by an end portion of an elongated beam or bar 19. Also fixed to the shaft 18 is a ground engaging wheel 20 which, as the same travels over the ground or more particularly within a furrow, will cause the wheel 20 to rotate in a direction to impart requisite rotation to the shaft 10.

The end portion of the bar or beam 19 remote from the wheel 20 is pivotally engaged with a trunnion 21 carried by and extending laterally from the beam B and preferably at a point rearwardly of the standard 1. By this means the bar or beam 19 is supported for swinging movement in a vertical direction whereby the wheel 20 may be adjusted into an inoperative position as desired and particularly when it is necessary to make a turn at the end of a furrow.

As herein disclosed, the requisite raising of the bar or beam 19 is accomplished through the medium of an elongated rod 22 extending in a direction lengthwise of the beam B and rotatably supported by the bearings 23 carried by the beam B and the handle structure H. The rod 22 at its forward end or at a point adjacent to the bearing 23 carried by the beam B is provided with a rock arm 24 with which is operatively engaged a link 25 or the like which in turn is operatively engaged, as at 26, with the lower or forward portion of the bar or member 19. By requisite rocking movement of the rod 22 the bar or beam 19 may be raised or elevated as desired, said bar or beam 19 moving downwardly by gravity.

The end portion of the rod 22 adjacent the bearing 23 carried by the handle structure H is also provided with a rock arm 27 extending transversely of the handle structure H and terminating in a hand grasp 28 substantially underlying a hand grasp 29 comprised in the handle structure H proper. The hand grasps 28 and 29, when the wheel 20 is in lowered or working position, are so related that the hand of the operator engaged with the hand grasp 29 may be easily engaged with the hand grasp 28 when it is desired to raise or elevate the wheel 20.

In order to hold the beam or bar 19 against undue lateral movement or in substantially a fixed path of travel in a vertical direction, I provide the spaced guide arms 30 depending from a head 31, said head 31 being provided with means, as at 32, to engage the beam B.

The bottom of the supplemental hopper S' is provided with a pair of discharge openings 33, each of which having in communication therewith a boot 34, one of the boots discharging directly behind the plow P and within the furrow open thereby while the second boot 34 is adapted to drop in the adjacent furrow being covered by the plow P and at a suitable point in advance of the moldboard of said plow.

The boots 34 are employed for dropping the seed and the seed is adapted to be intermittently delivered to each of the boots 34. As herein disclosed, the seeds are caused to alternately pass out through the boots 34 through the medium of the valve plate 35. This plate 35 fits substantially snug within the supplemental hopper S' or more particularly the seed compartment and is supported at a point substantially midway its ends for swinging or rocking movement by the trunnions 36. The outer trunnion 36 extends forwardly and exteriorly of the compartment 6 and terminates in a depending rock arm 37 operatively engaged, as at 38, with an end portion of a U-shaped member 39. The member 39 is supported for reciprocatory movement by the bearings 40 and 45 carried by an elongated strip or member 41 disposed on one side of the hopper S and in a direction away from the sprocket 15. This member or strip 41 is bolted or otherwise secured to a block 42 secured to the lower portion of the front wall of the hopper S and at one side thereof.

The inner end of the leg 44 of the member 39 is operatively engaged, as at 46, with a pitman 47 operatively engaged, as at 48, with a gear wheel 49. The wheel 49 is rotatably supported by an outstanding trunnion 50 carried by the front wall 7 of the hopper S and meshing with a face gear 51 carried by the gear 52 fixed to the extended portion 9' of the shaft 10. By this means, as the extension 9' rotates, the gear 49 will impart requisite reciprocation to the member 39 whereby the valve plate 35 will be intermittently rocked from one side to the other resulting in the seed delivered within the supplemental hopper S', being alternately discharged through the openings 33 and the associated boot 34.

In the event it is desired to have the seed to discharge through only a single boot 34, the gear 49 may be moved into a position out of mesh with the face gear 51 and the valve plate 35 adjusted to assure the desired discharge of the seed.

I also find it of advantage to provide my improved planter with means whereby the seed may be sowed and for this purpose I provide the bottom 2 of the hopper S with the transversely spaced openings 53, each of which being under control of a slide valve 54. Each of the valves 54 extends exteriorly through the rear face 55 of the hopper S and has operatively engaged, as at 56, through its extended portion the lower extremity of an upstanding lever 57. This lever 57 at a predetermined point intermediate its ends is supported, as at 58, for swinging movement in a horizontal direction. Upon proper manipulation of a lever 57 the associated valve 54 may be moved into either open or closed position as the requirements of practice may prefer.

The plate 59 has disposed therethrough an opening 60 in communication with each of the openings 53. The plate 59 is provided with the transversely spaced underhung bearings 61 which rotatably support the cylinder or drum 62. This drum or cylinder 62 in its periphery is provided with the circumferentially spaced pockets 63 which, upon rotation of the cylinder or drum 62, come into register with the openings 60 in the plate 59 and with such rapidity that the seed within the hopper S, and with the valves 54 in open position, is permitted to discharge from the hopper S in a manner to effect a sowing of the seed.

The cylinder or drum 62 has one end portion extended and to which is affixed a gear 52' meshing with the gear 52 whereby said drum or cylinder 62 will be properly rotated. This gear 52', when desired, can be readily adjusted out of engagement with the gear 52 and especially when the drum or cylinder 62 is not in use.

Associated with each series of openings 63 and suitably anchored, as at 64 with the under surface of the plate 59 are the chutes 65 one of which being adapted to discharge immediately behind the plow P and the other within an adjacent furrow being covered by said plow P. As the valves 54 are independently operated. it will be readily understood that the seed may be caused to discharge only through either one of the chutes 65 as may be preferred.

When the planter is employed for sowing it is preferred that the gear 49 be disengaged from the face gear 51 and that the belt 12 be removed.

In practice, as the plow P opens a furrow, seed is dropped in such furrow and at the same time seed is dropped into an adjacent furrow, said seed of the second furrow being covered by the soil turned by the plow P. The second furrow in practice is opened by a separate plow and team which travels ahead of the device as herein disclosed and alternates with the planter so that the plow P of the planter covers the furrow opened by the extra plow after the seed has been deposited while the extra plow as it opens a new furrow covers the seed in the furrow opened by the plow P of the planter. In view of this cooperation between the planter and an extra plow and team the planting of a field is materially expedited.

From the foregoing description it is thought to be obvious that a planter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a supporting member, a hopper mounted thereon, said hopper being provided with a supplemental hopper affording a seed receiving chamber, means for delivering seed from the main hopper to the receiving chamber of the supplemental hopper, boots having separate communication with the seed receiving chamber, a plate extending within the seed receiving chamber, trunnions for supporting the plate for rocking movement, a rock arm carried by one of the trunnions exteriorly of the supporting member, a substantially U-shaped member supported by the supporting member for reciprocating movement, an extremity of said U-shaped member being operatively engaged with the rock arm, a wheel rotatably supported by the supporting structure, means for rotating the wheel, and an operative connection between said wheel and the second extremity of the U-shaped member.

In testimony whereof I hereunto affix my signature.

BENJAMIN H. FUQUAY.